United States Patent [19]
Marino

[11] Patent Number: 5,184,915
[45] Date of Patent: Feb. 9, 1993

[54] APPARATUS FOR LIFTING UP WATER USING THE OCEAN TIDE ENERGY TO DO SO

[76] Inventor: John Marino, 6070 Languedoc, Montreal, Quebec, Canada, H1M 3C9

[21] Appl. No.: 855,926

[22] Filed: Mar. 23, 1992

[51] Int. Cl.⁵ .................................................. E02B 9/08
[52] U.S. Cl. .......................................... 405/76; 405/80; 405/52
[58] Field of Search ....................... 405/52, 75, 76, 77, 405/78, 80

[56] References Cited

U.S. PATENT DOCUMENTS

| | | | |
|---|---|---|---|
| 1,147,082 | 7/1915 | Farra | 405/76 |
| 1,294,808 | 2/1919 | Jenkins | 405/76 |
| 2,044,686 | 6/1936 | Harrison et al. | 405/76 |
| 3,487,228 | 12/1969 | Kriegel | 405/76 X |
| 4,564,312 | 1/1986 | Saiz | 405/76 |

Primary Examiner—David H. Corbin
Attorney, Agent, or Firm—Robic

[57] ABSTRACT

An apparatus is disclosed, for lifting up water to a predetermined level where it can be useful, using the inexhaustible and non-polluting source of energy of the ocean tides to do so. The apparatus comprises a water chamber positioned to be filled with water following a rise in tide. Rising on the tide causes some air to be trapped and pressurized on top of the chamber. This pressurized air in turn is used to push some water up to the predetermined level.

6 Claims, 2 Drawing Sheets

APPARATUS FOR LIFTING UP WATER USING THE OCEAN TIDE ENERGY TO DO SO

BACKGROUND OF THE INVENTION a) Field of the Invention

This invention relates to an apparatus for lifting up water to a predetermined level where it can be useful, using the ocean tides as a power source to do so.

b) Description of Related Art

Applicant is not aware of any apparatus that uses the ocean tide as an inexhaustible and non-polluting source of energy for lifting up water. However, such a lifting up of water is required for numerous applications, such as to reach the level of a de-salting plant for irrigation purpose.

The object of the present invention is to provide an apparatus for lifting up water to a predetermined level, wherein the source of energy that is used to do so is inexhaustible and non-polluting to the environment.

SUMMARY OF THE INVENTION

In accordance with the invention, this object is achieved with an apparatus using the inexhaustible and non-polluting source of energy of the ocean tides for lifting up water to a predetermined level higher than the level of the high tide, comprising a water chamber in water communication with the ocean so as to be filled with water following a rise in tide. The water chamber has an upper portion that is airtight and defines a pressurized air chamber when water is filling up the water chamber as the tide rises.

The apparatus also comprises a unidirectional water intake consisting of a first substantially horizontal pipe in water communication with the ocean at the bottom of the water chamber so as to be filled up with water when the tide is rising.

The apparatus further comprises a second substantially vertical pipe extending upwardly from the first pipe up to the air chamber, this second pipe having a top end provided with a pressure release valve.

A unidirectional flow valve is mounted in the first pipe upstream of the second pipe so as to prevent water from flowing backwards.

The apparatus still further comprises a water outlet consisting of a third pipe extending upwardly from the first pipe up to the predetermined level, this third pipe being positioned downstream the unidirectional flow valve of the first pipe.

In addition, the apparatus comprises a suction-actuated valve positioned and adapted to allow communication between the upper portion of the water chamber and external air for allowing air to enter the water chamber and water to get out of this chamber when the tide is lowering.

When the water chamber is almost filled up with water as the tide rises and the pressure in the air chamber reaches a given level, the release pressure valve is actuated to open the second vertical pipe. This in turn allows the pressure built up in the air chamber to push the water down in the second vertical pipe and then up to the predetermined level in the third pipe.

Advantageously, predetermined level is at a height above the high tide level that is less than half the difference in heights between the high and low tides.

BRIEF DESCRIPTION OF THE DRAWINGS

The invention will be better understood upon reading the following non restrictive description of a preferred embodiment thereof, made with reference to the accompanying drawings in which.

DESCRIPTION OF TWO PREFERRED EMBODIMENTS OF THE INVENTION

Figure 1:
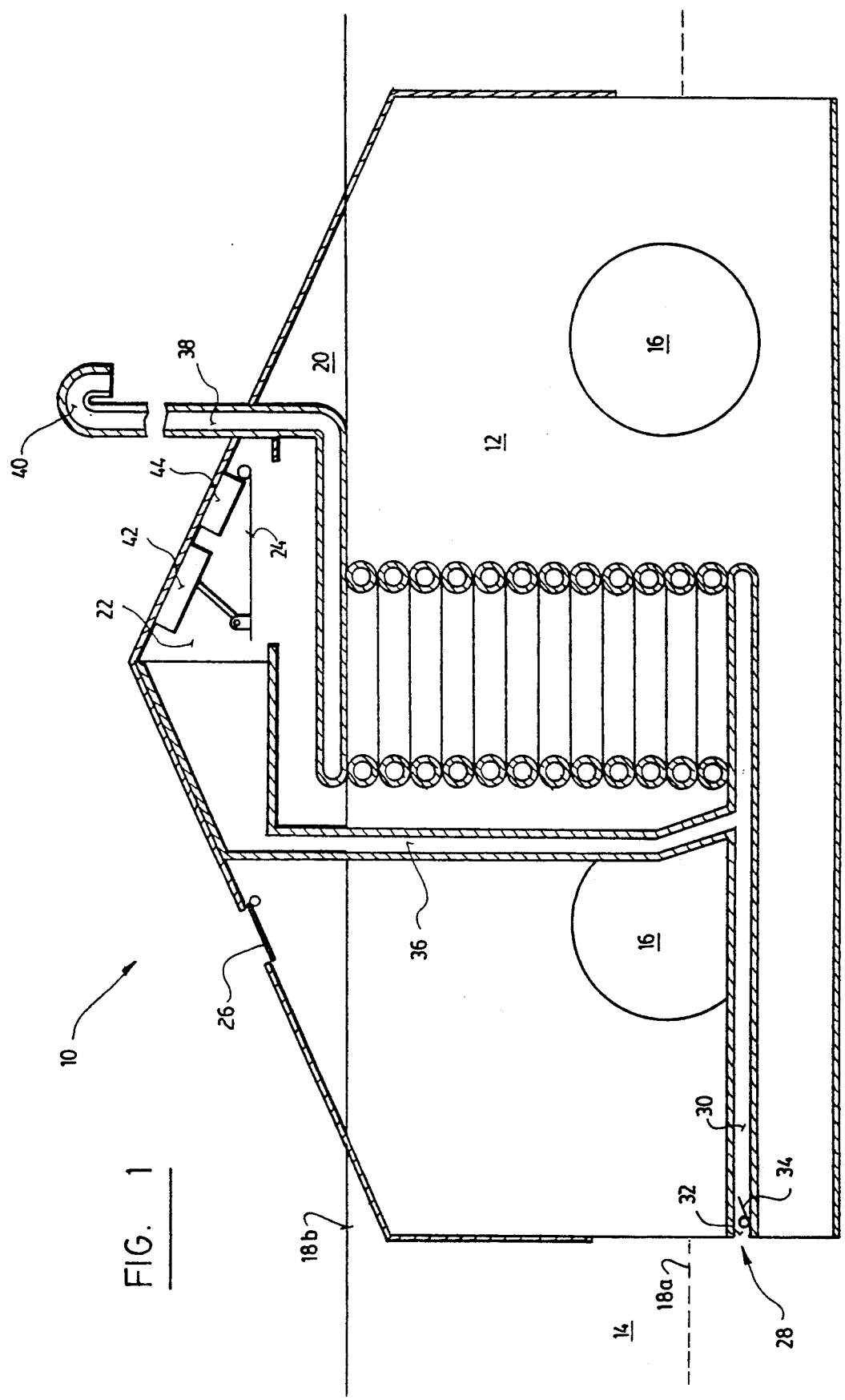
FIG. 1 is a cross-sectional view of the apparatus for lifting up water according to a first embodiment of the invention, mounted directly onto the ocean floor.

FIG. 1 shows a first apparatus 10 according to the invention for lifting up water above the ocean level, that uses the ocean tide as an energy source to do so.

The apparatus 10 comprises a water chamber 12 that is in water communication with the ocean 14 through openings 16 so that it can be filled with water following a rise in the tide 18. Preferably, these openings 16 are located under than the lowest tide 18a so that the water chamber 12 is never completely emptied at the lowest tide. Upon the rise of the tide, the water chamber 12 is slowly filled. Its upper portion is made air-tight and causes an air pocket to be formed above the water level on top of the water chamber 12. This air pocket defines an air chamber 20. The upper part 22 of the air chamber 20 includes a pressure release valve 24 that can be actuated manually or automatically upon a raise in pressure above a certain level in the air pocket. The upper portion of the water chamber 12 also includes a unidirectional air flow valve 26 that allows the chamber 12 to be filled with air when the tide is lowering thereby avoiding the creation of a vacuum inside the chamber, that would prevent this chamber from emptying.

The apparatus also comprises a unidirectional water intake 28 that consists of a substantially horizontal first pipe 30 in water communication with the ocean so as to be filled with water when the tide is rising. This first pipe 30 includes near its inlet end 32, a back flow valve 34 preventing back flow of the water in the ocean. Downstream that valve 34 is positioned in fluid communication with the first pipe 30 a second substantially vertical pipe 36 that extends upwardly up to the air chamber 22.

Downstream the second vertical pipe 36, is positioned a water outlet in the form of a third pipe 38 that may be in the form of a coil and has an upper extremity 40 positioned at a predetermined level that is higher than the level of the high tide 18b but lower than half of the difference in heights between the low and high tides, above the latter.

In use, the water chamber 20 gets filled with water as the tide 18 rises, thereby creating a rise in pressure in the air chamber 22. When the pressure reaches a given level, the release pressure valve 24 is opened and allows the air pressure built up on top of the water chamber to push down the column of water inside the substantially vertical pipe 36. This in turn causes some of the water trapped within the first and third pipes because of the valve 34, to move up through the third pipe 38 up the upper extremity 40 of this third pipe, and then out.

The pressure release valve 24 may comprise an actuating mechanism 42 and a pressure sensor 44 so that the opening of the valve 24 is done automatically at a given pressure level. Then the pressure-release valve 24 may automatically shut off once the pressure has returned back to atmosphere.

Preferably, the first pipe 34 of the water intake 28 is located underneath the level of the lowest tide 18a, so that air cannot penetrate at least in the bottom portion of the pipes.

Figure 2:
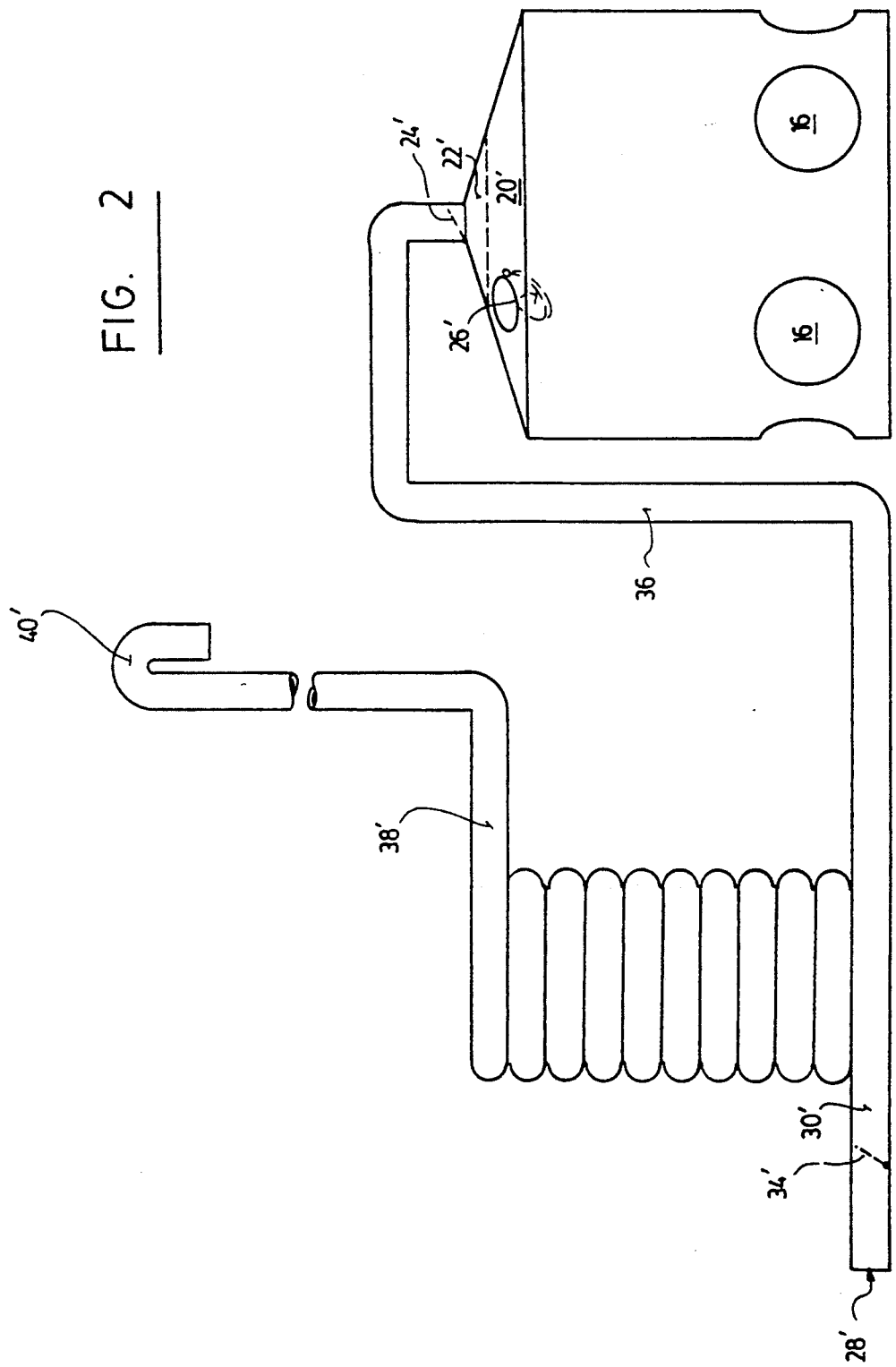
FIG. 2 is a cross-section view of another apparatus for lifting up water according to a second embodiment of the invention.

A second embodiment of the invention is shown in FIG. 2 where the same structural components have been identified with the same reference numerals plus a distinguishing "prime". In this embodiment, the water intake 28' and water outlet 38' are positioned outside of the water chamber 20'. Moreover, the pressure release valve 24' is mounted at the upper end of the second pipe 36'. The functioning of this apparatus is essentially the same as the one shown in FIG. 1.

I claim:

1. An apparatus using the inexhaustible non-polluting source of energy of the ocean tides for lifting up water to a predetermined level higher than the level of the high tide, comprising, in combination:
  a water chamber in water communication with the ocean so as to be filled with water following a rise in tide, this water chamber having an upper portion that is air tight and define the pressurized air chamber when water is filling up the water chamber as the tide rises;
  an unidirectional water intake consisting of a first, substantially horizontal pipe in water communication with the ocean at the bottom of the water chamber, so as to be filled up with water when the tide is rising;
  a second, substantially vertical pipe extending upwardly from the first pipe up to the air chamber, this second pipe having a top end closable with a pressure release valve;
  an unidirectional flow valve mounted in the first pipe upstream of the second pipe so as to prevent water from flowing backwards;
  a water outlet consisting of a third pipe extending upwardly from the first pipe up to the predetermined level, the third pipe being positioned downstream the unidirectional flow valve of the first pipe; and
  a suction-actuated valve positioned and adapted to allow communication between the upper portion of the water chamber and external air for allowing air to enter the water chamber and water to get out of this chamber when the tide is lowering,
whereby, in use, when the water chamber is almost filled up with water as the tide rises and the pressure in the air chamber reaches a given level, the pressure release valve is actuated to open the second vertical pipe, this in turn allowing the pressure built up in the air chamber to push the water down in the second vertical pipe and then up to the predetermined level in the third pipe.

2. The apparatus of claim 1 wherein said predetermined level is at height above the high tide level that is less than half the difference in heights between the high and low tides.

3. The apparatus according to claim 2, wherein the pressure release valve is manually operated.

4. The apparatus according to claim 2, wherein the pressure release valve comprises a pressure sensor for automatically actuating said pressure release valve at a predetermined high pressure built up into said air chamber, said pressure release valve returning to a closed position upon return of the pressure in said air chamber to a lower value.

5. The apparatus according to claim 4, wherein the water chamber is in water communication with the ocean by means of at least one opening located under the level of the lowerest tide.

6. The apparatus according to claim 5, wherein first pipe forming the water intake is located under the level of the lowest tide so that air never enters in said first pipe.

* * * * *